(No Model.)
D. M. WESTON.
CENTRIFUGAL MACHINE.
No. 275,875. Patented Apr. 17, 1883.
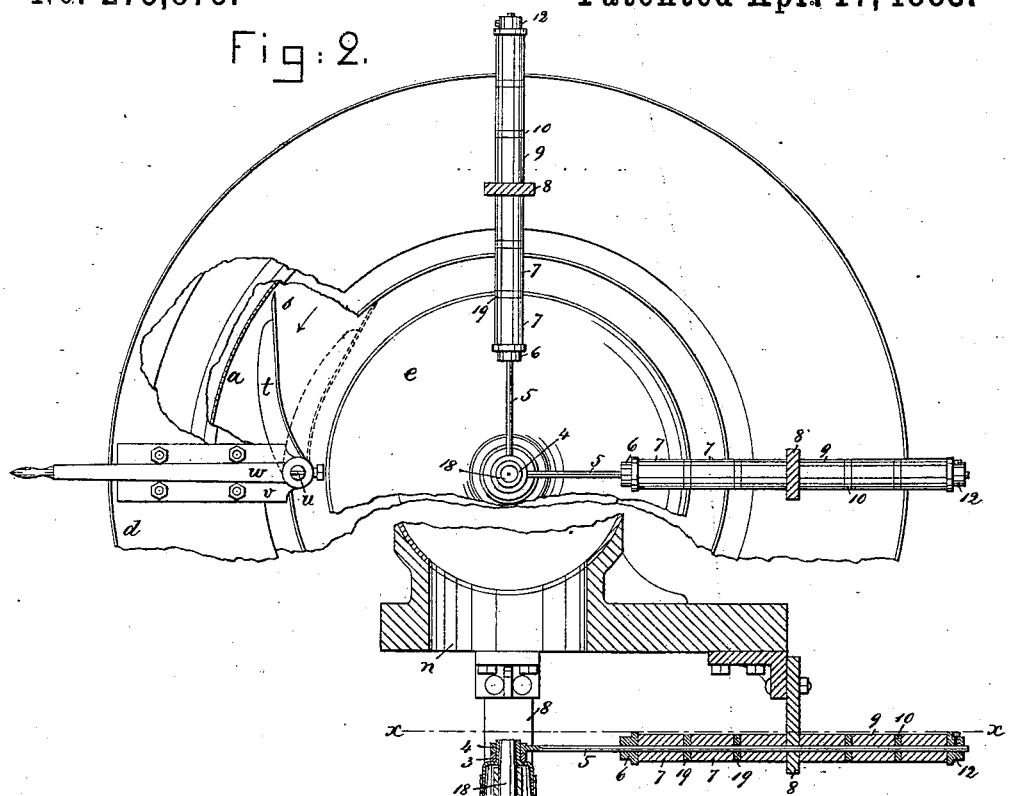
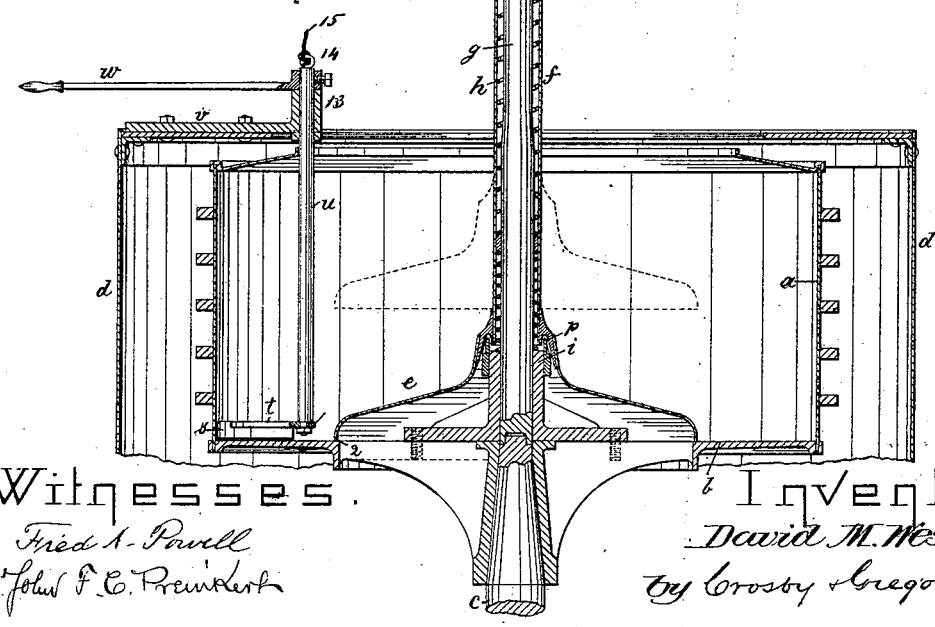
Witnesses.
Fred A. Powell
John F. C. Prendert
Inventor.
David M. Weston
by Crosby & Gregory Attys.

UNITED STATES PATENT OFFICE.

DAVID M. WESTON, OF BOSTON, MASSACHUSETTS.

CENTRIFUGAL MACHINE.

SPECIFICATION forming part of Letters Patent No. 275,875, dated April 17, 1883.

Application filed August 22, 1882. (No model.)

*To all whom it may concern:*

Be it known that I, DAVID M. WESTON, of Boston, county of Suffolk, State of Massachusetts, have invented an Improvement in Centrifugal Machines, of which the following description, in connection with the accompanying drawings, is a specification.

This invention is an improvement on United States Patent No. 63,770, granted to me April 9, 1867. In that patent I showed a valve to close the outlets at the bottom of the centrifugal basket when the basket was being filled, and rotated to throw its contents against the inner walls of the basket, and to discharge the basket the valve was raised by hand and fastened, and before again filling the basket the valve was lowered carefully by hand. The said valves, being quite heavy, were sometimes dropped when preparing to lower them, and, falling, were frequently broken, and it also frequently happened that the arms and hands of the workman who was discharging the machine were injured by the dropping of the valve. In this my present invention the tendency of the valve to descend by its own gravity is a little more than overcome by what I denominate a "counter-balance," which may be a spring or equivalent device, the normal position of the valve under the influence of the counter-balance being away from or above the bottom of the basket, so as to open its bottom. The weight of the valve in excess of the power of the counter-balance is such that the sirupy mass of sugar flowing down from the usual gate above the basket and striking the top of the valve is sufficient to cause it to move down gently upon its seat at the bottom of and close the bottom of the basket. As soon as the machine starts, and the contents of the basket are thrown against the inner wall thereof by centrifugal action, the absence of the sirupy mass of sugar from above the valve permits it to rise under the action of the counter-balance and resume its normal position, leaving the bottom of the basket wide open, ready to permit the charge to be delivered from the bottom of the machine. In this way I am enabled to save lifting and lowering the heavy valve by hand, and also the time of manipulating it, which is very considerable, and all possibility of accidents by the dropping of the valve is avoided.

My invention also includes a novel application of a plow to undermine and carry out the sugar formed as a wall inside the basket. The said plow is inserted within the basket from its top, and is then turned aside to enter the sugar wall at its base.

Figure 1 shows in vertical section a sufficient portion of a centrifugal machine to illustrate a practical embodiment of my invention; Fig. 2, a top view of the main part of the apparatus shown in Fig. 1 below the dotted line $x\,x$, a part of the basket and outer casing being broken out to show the plow in its extreme positions near the bottom of the basket.

The basket $a$, the bottom $b$, spindle $c$, its support, (not shown,) and the outer casing, $d$, are and may be all as usual, or as shown in other patents granted to me.

The valve $e$, preferably made of sheet metal, and conical, is connected to the lower end of a tube, $f$, which surrounds a spindle, $g$, there being placed between the spindle $g$ and tube $f$ a counter-balance for the weight of the valve, the said counter-balance being herein shown as a spiral spring, $h$, one end of which rests upon a fixed hub, $i$, the said spring receiving at its upper end a collar, $m$, attached to the sleeve $f$ and running loosely on the spindle. This spring is sufficiently strong to normally keep the valve elevated, as shown in dotted lines, Fig. 1. As soon as the sirupy mass of sugar passing from the mouth $n$ of the usual gate of the mixer drops into the basket and falls upon the top of the valve $e$ the weight of the said sirupy mass acts to depress the valve upon its seat 2 and close the bottom of the basket, where the valve will remain until the contents of the basket, by centrifugal action, have been thrown from the center of the basket and off the top of the valve against the inner side of the basket, when the counter-balance or spring will again resume its control of the valve and raise the same into its normal position, as described, above the bottom of the basket.

Instead of the counter-balance being made in the form of a spring, I might employ a cord or chain connected with the sleeve or valve, extend the cord over a pulley, hang a weight upon the cord, and permit the said weight to enter and rise and fall in a hollow spindle, which would then be employed instead of the solid spindle $c$, herein shown. The spindle $g$ is notched at its foot to fit a stud at the top of the spindle $c$, and the hub $i$, in which the spindle $g$ rests, has its flange bolted or screwed to the arms of the bottom $b$. The hub $i$ has a collar or step, $p$, which guides and steadies the lower end of the tube and its connected valve with relation to spindle $g$. The upper end of the spindle $g$ has a pin, 18, which receives over it two collars, 3 4, at the ends of the arms 5, extended through a collar, 6, a series of washers, 19, and india-rubber springs 7, thence through fixed brackets and other india-rubber springs 9 and washers 10, when the said rods receive upon them collars 12. The rods or india-rubber springs assist in steadying the machine. The spindle has at its upper end a sleeve, $r$, to guide the upper end of the tube $f$ as it rises and falls.

The plow $s$ is a narrow piece of steel secured upon an arm, $t$, fastened at the lower end of a shaft, $u$, held loosely in the long hub 13 of a bracket, $v$, secured to the top of the casing $d$, and provided with a hand-lever, $w$. The shaft $u$, at its upper end, has an eye, 14, with which may be connected a suitable chain or cord, 15, which latter will be attached to a pulley or other suitable device, so that the shaft and plow may be elevated until the arm $t$ strikes the lower end of the hub 13, in which position the shaft $u$ may be turned and enable the plow, then just above the level of the top of the basket, to be turned aside into the space between the top of the basket and the under side of the top flange of the casing $d$. This is the normal condition of the plow. As soon as the contents of the basket have been thrown out against its inner side, as usual, and the valve has assumed its elevated position, as described, the machine will have its speed reduced properly for discharging its contents, and the plow will be turned from its position between the basket and casing, will be lowered inside the drum, the shaft $u$ then sliding downward, and the plow will be gradually turned from its dotted-line position, Fig. 2, into the sugar wall, cutting into the bottom of the same back to the wall of the basket and undermining the said wall, when it will drop, and, as it drops, the plow, occupying its full-line position, Fig. 1, will force the contents of the basket toward the center of the basket, when it will drop out through the open lower end of the basket.

I do not broadly claim a plow, as I show such device in an earlier patent granted to me.

I claim—

1. In a centrifugal machine, the basket $c$, open centrally at its bottom, combined with the sliding or movable valve $e$, the weight of which is counterbalanced, as described, the said valve being adapted to be moved to close the bottom of the basket by the weight or pressure upon its upper side of the contents of the basket in contact with the said valve, substantially as set forth.

2. The casing, the bracket provided with a hub, the shaft $u$, fitted to slide and rotate therein, and the connected plow, combined with the basket, the said plow being adapted to be inserted into the top of the basket, lowered into the basket by sliding the shaft, and turned into the sugar wall, to operate all substantially as described.

In testimony whereof I have signed my name to this specification in the presence of two subscribing witnesses.

DAVID M. WESTON.

Witnesses:
G. W. GREGORY,
B. J. NOYES.